United States Patent
Imaida et al.

[11] Patent Number: 5,941,787
[45] Date of Patent: Aug. 24, 1999

[54] ARRANGEMENT OF PULLEY WORKING FLUID PASSAGE IN A BELT-TYPE CONTINUOUSLY VARIABLE TRANSMISSION

[75] Inventors: Makoto Imaida, Kanagawa; Kiyofumi Tanaka, Tokyo; Yusuke Kasuya; Masahiko Yamada, both of Aichi, all of Japan

[73] Assignee: Nissan Motor Co., Ltd, Yokohama, Japan

[21] Appl. No.: 09/006,383

[22] Filed: Jan. 13, 1998

[30] Foreign Application Priority Data

Jan. 24, 1997 [JP] Japan ................................. 9-011625

[51] Int. Cl.⁶ .......................... F16H 59/00; F16H 61/00; B60K 41/12
[52] U.S. Cl. ................................ 474/18; 474/28; 477/45
[58] Field of Search .................................. 474/18, 28, 8, 474/11, 12, 69, 70; 477/45, 46, 47, 48, 49

[56] References Cited

U.S. PATENT DOCUMENTS

| | | | |
|---|---|---|---|
| 4,813,914 | 3/1989 | Mott | 474/8 |
| 5,628,700 | 5/1997 | Yamada et al. | 474/18 |
| 5,697,866 | 12/1997 | Okahara | 477/169 |
| 5,730,680 | 3/1998 | Toukura | 477/46 |

FOREIGN PATENT DOCUMENTS

| | | |
|---|---|---|
| 0 004 130 | 9/1979 | European Pat. Off. |
| 0 520 611 | 12/1992 | European Pat. Off. |
| 8-14348 | 1/1996 | Japan . |
| 1 527 214 | 10/1978 | United Kingdom . |
| 2 092 246 | 8/1982 | United Kingdom . |
| 2 260 582 | 4/1993 | United Kingdom . |

Primary Examiner—John A. Jeffery
Assistant Examiner—Matthew A. Kaness
Attorney, Agent, or Firm—Foley & Lardner

[57] ABSTRACT

In a pulley working fluid (oil) passage arrangement for a belt-type continuously variable transmission having a V belt wound about a letter V-shaped groove formed with mutually opposing oblique surfaces of movable and stationary sheaves and a working fluid pressure cylinder chamber to which a working fluid pressure is supplied so as to move the movable sheave toward or away from the stationary sheave, thus a gear shift being varied, a first working fluid passage communicated with an axle chamber working fluid passage is extended in an axial direction of the axle member at an opposing surface thereof against the axle member and the movable sheave and a second working fluid passage having one end communicated with the first working fluid passage and the other end opened to a working fluid pressure cylinder chamber is extended along a radial direction of the axle member.

10 Claims, 4 Drawing Sheets

ARRANGEMENT OF PULLEY WORKING FLUID PASSAGE IN A BELT-TYPE CONTINUOUSLY VARIABLE TRANSMISSION

The contents of Application No. Heisei 9-011625, with a filing date of Jan. 24, 1997 in Japan, are herein incorporated by reference.

BACKGROUND OF THE INVENTION a) Field of the Invention

The present invention relates to an arrangement of a pulley oil passage for a vehicular belt-type continuously variable transmission which improves a workability of the pulley oil passage.

b) Description of the Related Art

A Japanese Patent Application First Publication No. Heisei 8-14378 published on Jan. 16, 1996 exemplifies movable sheave drive mechanism and pulley oil passage structures of a previously proposed belt type continuously variable transmission.

In the previously proposed belt-type continuously variable transmission disclosed in the above-identified Japanese Patent Application First Publication, a movable sheave is restrained on an axle member so as to be enabled to be moved only in an axial direction of the axle member by means of a ball spline. A supply of a pressurized working fluid toward a fluid pressure cylinder chamber formed on a rear surface side of the movable sheave causes the movable sheave to be moved toward an opposing stationary sheave. The movable sheave is biased so as to be approached to the stationary sheave by means of a coil spring having one end fixed onto a seat portion of the movable sheave formed with a step portion located on the rear surface of the movable sheave within the working fluid cylinder chamber.

The pressurized working fluid is supplied within the working fluid chamber cylinder via an axle member axially extended oil passage, an axle member radially extended oil passage, and a pulley oil passage. The axle member axially extended oil passage is extended along the axial direction from a center of the axle member. The axle member radially extended oil passage is extended along a radial direction of the axle member from a tip of the axle member axially extended oil passage. The pulley oil passage, as described above, is disposed on the step portion of the movable sheave having a sufficiently thick wall thickness and an axial center of the pulley oil passage is slightly obliquely slanted to the radial direction of the axle member.

It is noted that although another previously proposed belt-type continuously variable transmission is provided with such a pulley movement mechanism as that within the movable sheave in which the coil spring is not disposed within the working fluid pressure cylinder chamber, its oil passage formed on the movable sheave is obliquely slanted through the step portion of the movable sheave.

SUMMARY OF THE INVENTION

However, when the pulley oil passage is drilled with its axle obliqued, it is necessary to perform a working operation with such a tool as a drill as to make an opening of the oil passage obliquely set. Consequently, a workability of the pulley oil passage is worsened.

It is, therefore, an object of the present invention to provide a pulley oil passage arrangement of a belt-type continuously variable transmission with no necessity to drill the pulley oil passage obliquely.

The above-described object can be achieved by providing an arrangement for a belt-type continuously variable transmission, comprising: a) an elongate axle member; b) a stationary sheave fixed onto the axle member and having a first approximately oblique surface; c) a movable sheave movable along the axle member with respect to the stationary sheave and having a second approximately oblique surface; d) a V belt in an endless form wound on both mutually opposing first and second oblique surfaces of the stationary sheave and the movable sheave by which an approximately letter V-shaped groove is formed; e) a working fluid pressure cylinder chamber formed against a rear surface of the movable sheave with respect to the second oblique surface thereof; f) a pressurized working fluid which is supplied to the working fluid pressure cylinder chamber so as to move the movable sheave toward or away from the stationary sheave to make a gear shift of the belt-type continuously variable transmission; g) an axle member working fluid passage disposed within the axle member so as to be enabled for the pressurized working fluid to be supplied to the working fluid pressure cylinder chamber; h) a first working fluid passage which is communicated with the axle member working fluid passage at an opposing surface thereof against the movable sheave and the axle member and which is extended along an axial direction of the axle member; and i) a second working fluid passage penetrated radially through the movable sheave and having one end communicated with the first working fluid passage and the other end opened to the working fluid pressure cylinder chamber.

BEST MODE FOR CARRYING OUT THE INVENTION

Reference will hereinafter be made to the drawings in order to facilitate a better understanding of the present invention.

Figure 1:
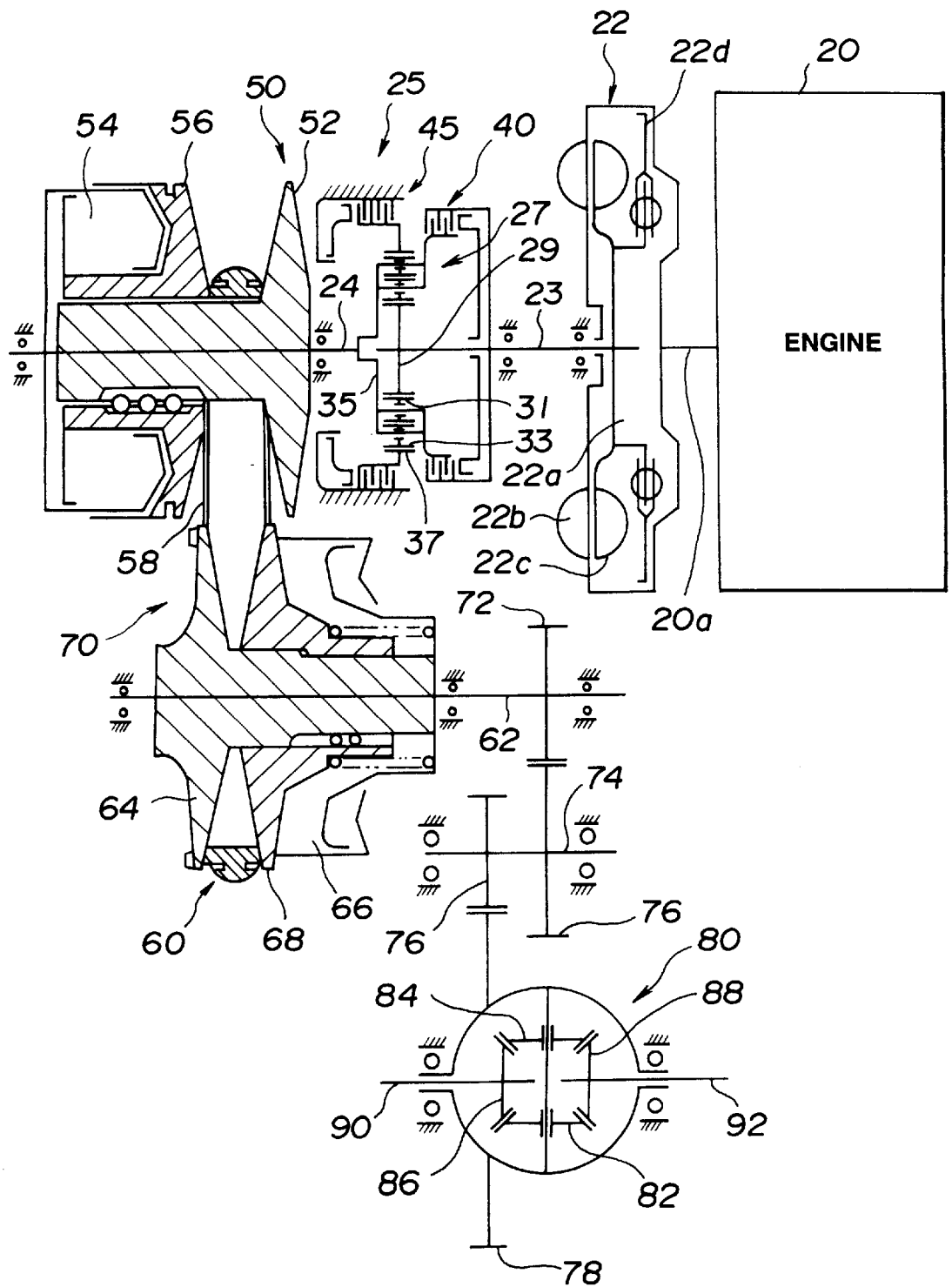
FIG. 1 is a schematic explanatory view of a power transmission mechanism of a belt-type continuously variable transmission to which a pulley oil passage arrangement in a preferred embodiment according to the present invention is applicable.

FIG. 1 shows a skeleton view in a power transmission mechanism of a belt-type (so-called, V-belt type) continuously variable transmission to which a pulley oil (working fluid) passage arrangement according to the present invention is applicable.

In FIG. 1, an engine 20 as a prime mover of an automotive vehicle has an output axle 20a linked to a fluid coupling device 22 as a fluid transmission device (specifically, a torque converter). The fluid coupling device 22 is provided with a lock-up mechanism.

An output axle of the fluid coupling device 22 is linked to a rotary axle 23. The rotary axle 23 is linked to a forward/ reverse change-over mechanism 25. The forward/reverse change-over mechanism includes a planetary gear mechanism 27, a forwarding clutch 40, and a reverse brake 45.

The planetary gear mechanism 27 includes a sun gear 29, a pinion carrier 35 having two pinion gears 31 and 33, and an internal gear 37. The sun gear 29 is linked to the rotary axle 23 so as to always be integrally revolved with the rotary axle 23. The pinion carrier 35 is enabled to be linked with the rotary axle 23 by means of the forwarding clutch 40. In addition, the internal gear 37 is linked to a drive axle 24 arranged on an outer periphery of the rotary axle 23. A drive pulley 50 is disposed on the drive axle 24.

The drive pulley 50 includes a stationary sheave 52 and a movable sheave 55, each sheave having an oblique surface opposed to each other to form an approximately letter V-shaped pulley groove. A V belt 58 is wound about the V-shaped pulley groove to form an endless belt. The stationary sheave 52 is integrated with the drive axle 24. The movable sheave 68 is attached onto a driven axle 62 so as to be enabled to be moved only in an axial direction by means of a ball spline of a spline coupling and is movable in the axial direction of the driven axle 62 by means of a hydraulic pressure acted upon a driven pulley working fluid cylinder chamber 66 formed on a rear surface thereof.

These drive pulley 50, V belt 58, and driven pulley 60 constitute a V-belt type continuously variable transmission mechanism 70. A drive gear 72 is fixed onto a drive axle 62. The drive gear 72 is meshed with an idler gear 76 on an idler axle 74. A pinion gear 76 disposed on the idler axle 74 is always meshed with a final gear 78. A pair of pinion gears 82 and 84 are meshed with a pair of side gears 86 and 88, each side gear 86 and 88 being a corresponding one of a pair of output axles 90 and 92.

A rotating force inputted from the output axle 20a of the engine 20 into the power transmission mechanism is transmitted to the forward/reverse change-over mechanism 25 via the fluid coupling device 22 and the rotary axle 23. At this time, the forwarding clutch 40 is engaged. When the reverse brake 45 is released, the rotating force of the rotary axle 23 is transmitted to the drive axle 24 in the same rotating direction via the integrally rotating planetary gear mechanism 27.

On the other hand, in a case where the forwarding clutch 40 is released and the reverse brake 45 is engaged, an action of the planetary gear mechanism 27 causes the rotating force of the rotary axle 23 to be transmitted to the drive axle 24 with its rotating direction reversed. The rotating force of the drive axle 24 is transmitted to a differential device 80 via the drive pulley 50, the V belt 58, the driven pulley 62, the drive gear 72, an idler gear 76 on an idler axle 74, the pinion gear 76, and the final gear 78 so that the output axles 90 and 92 are revolved in the forward direction or reverse direction.

It is noted that in a case where both of the forwarding clutch 40 and the reverse brake 45 are released, the whole power transmission mechanism is in a neutral state.

When the power transmission is carried out, the movable sheave 56 of the drive pulley 50 and the movable sheave 68 of the driven pulley 60 are moved in the axial direction thereof, a radius of positions of the movable sheaves 56 and 68 contacted against the V belt 58 is varied so that a revolution ratio between the drive pulley 50 and the driven pulley 60 can be changed.

For example, when a width of the letter V-shaped pulley groove of the drive pulley 50 is widened together with a narrowing of a width of the letter V-shaped pulley groove of the driven pulley 60, the radius of the position of the corresponding movable sheave contacted against the V belt 58 at the driven pulley 50 becomes reduced. The radius of the position of the corresponding movable sheave contacted against the V belt 58 at the driven pulley 60 is, in turn, enlarged. Consequently, a large gear shift ratio can be achieved. If the movable sheaves 56 and 68 are moved in the opposite directions to the above-described directions, the gear shift ratio is, in turn, reduced.

Next, a specific structure of the driven pulley 60 in the belt-type continuously variable transmission shown in FIG. 1 will be described in details with reference to FIGS. 2 and 3.

Figure 2:
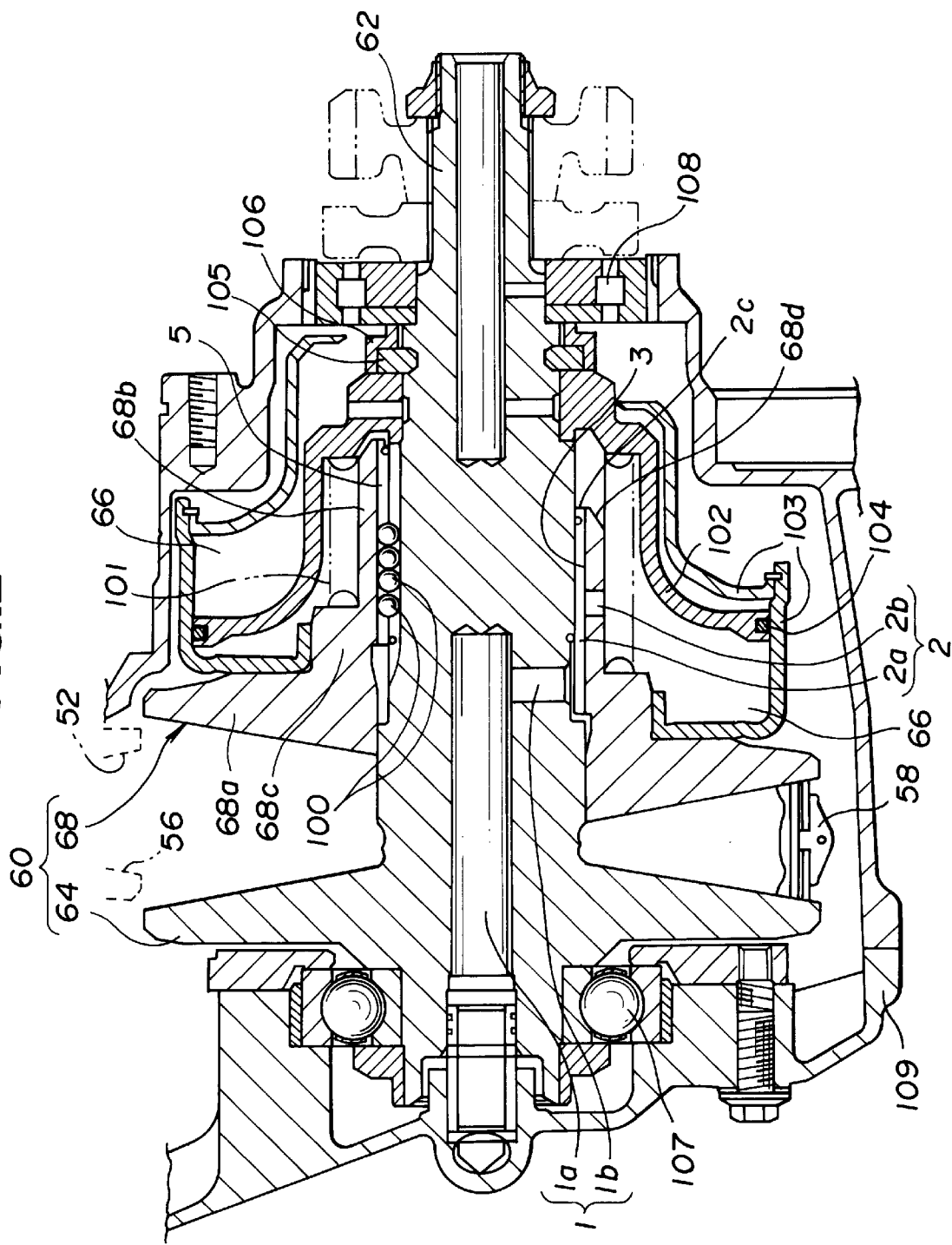
FIG. 2 is a side cross sectional view of an essential part of the belt-type continuously variable transmission for explaining the pulley oil (working fluid) passage in the embodiment according to the present invention.

It is noted that an upper part of FIG. 2 with respect to the driven axle 62 indicates that the movable sheave 68 is supported from the stationary sheave 64 and a lower part of FIG. 2 indicates that the movable sheath 68 is approached to the stationary sheath 64.

The stationary sheave 64 is integrated with the driven axle 62 which is an axial member rotatably supported on a casing 109 via bearings 107 and 108.

The movable sheave 68 includes: a pulley main body 68a coaxially arranged on an outer periphery of the driven axle 62 and having an oblique surface opposed to the stationary sheave 64; and a pulley linkage portion 68b in a cylindrical shape of a thin wall thickness integrated to a rear surface of the pulley main body 68a (a surface not opposed against the stationary sheave 64).

The pulley linkage portion 68b is arranged coaxially on the outer periphery of the driven axle 62 and is linked to the driven axle 62 so as to be enabled to be moved in the axial direction of the driven axle 62 by means of the ball spline of the spline coupling formed between the pulley linkage portion 68b and the driven axle 62. It is noted that a numeral 100 in FIG. 2 denotes balls (spherical bodies) in the ball spline.

In addition, a junction portion between the pulley main body 68a and the pulley linkage portion 68b has a step portion 68c which is thicker than the pulley linkage portion 68b. The step portion 68C serves as a seat portion of a coil spring 101 as will be described later.

A driven pulley working fluid cylinder chamber 66 is installed against the rear surface of the movable sheave 68. The driven pulley working fluid cylinder chamber 66 is formed with two partitioned spaces defined by a cylinder member 102 and piston members 103. In details, a predetermined space is covered with the piston members 103 integrally fixed to the rear surface of the pulley main body 68a and the driven pulley working fluid cylinder chamber 66 is formed with the cylinder member 102 arranged so as to partition the predetermined space covered with the piston member 103. The cylinder member 102 has an inner peripheral end fixed on the driven axle 62 and has an outer peripheral end contacted against an inner peripheral surface of the piston members 103 via a sealing member 104. In FIG. 2, numerals 105 and 106 denote a C shaped ring and a retainer, each for restraining the cylinder member 102 from being moved, respectively.

Furthermore, at least one coil spring 101 is interposed between the step portion 68c of the movable sheave 68 and the cylinder member 102 and is extended within the driven pulley working fluid cylinder chamber 66. The coil spring 101 is disposed so that the movable sheath 68 is pressed against the stationary sheath 64 even if the working fluid pressure is not acted upon the driven pulley working fluid cylinder chamber 66 so as to be enabled to hold the V belt 58 on the V-shaped groove. The coil spring 101 is coaxially arranged over the driven axle 62 and over the outer periphery of the pulley linkage portion 68b of the movable sheave 68.

The working fluid pressure of the driven pulley working fluid cylinder chamber 66 and the coil spring 101 constitute a pulley movement mechanism.

Next, an oil (pressurized working fluid) passage via which the working fluid is supplied to the driven pulley working fluid cylinder chamber 66 will be described below.

The working fluid is supplied to the driven pulley working fluid cylinder chamber 66 via a driven axle axially extended oil (or working fluid) passage 1 and a pulley oil (working fluid) passage 2, the driven axle axially extended working fluid passage 1 being communicated with a hydraulic control valve in a hydraulic circuit (not shown). The hydraulic circuit is exemplified by an allowed U.S. Pat. application Ser. No. 08/450,642 (the disclosure of which is herein incorporated by reference).

The driven axle axially extended working fluid passage 1 includes an axially extended working fluid passage 1a and three (a plurality of) radially extended working fluid passages 1b, 1b, and 1b.

The axially extended working fluid passage 1a is formed and penetrated along the axial direction of the driven axle 62. The radially extended working fluid passages 1b are communicated with the axially extended working fluid passage 1a at a tip of the passage 1a and are extended in the radial direction of the driven axle 62 so as to be opened on the outer peripheral surface of the driven axle 62. As shown in FIG. 3, the radially extended working fluid passages 1b are three each being extended in a radial direction from a corresponding peripheral end of the axially extended working fluid passage 1a and are designed to have a mutual phase angle to another adjacent passage 1b in a peripheral direction by approximately 120°.

The pulley oil (working fluid) passage 2 includes a plurality of (three) pulley axially extended oil passages 2a which constitute a first working fluid (oil) passage and a plurality of (three) pulley radially extended oil passages 2b, 2b, and 2b which constitute a second working fluid (oil) passage.

The pulley axially extended working fluid passages 2a include an axial groove 3 formed on an inner peripheral surface of the pulley linkage portion 68b and a space formed between the axial groove 3 and an opposing outer peripheral surface of the driven axle 62 and extended along the axial direction of the driven axle 62.

The axial groove 3 is disposed at a position enabled to be opposed in the circumferential direction against its openings of the radially extended oil passages 1b and is axially extended up to an end 68d in the axial direction of the pulley linkage portion 68b so that the pulley axially extended oil passages 2a are communicated with the driven pulley working fluid cylinder chamber 66.

In addition, each one end of the pulley radially extended working fluid passages 2b is communicated with a corresponding one of the pulley axially extended working fluid passages 2a at a position located in a circumferential direction thereof and at which each pulley radially extended oil passage 2b is communicated with each pulley axially extended working fluid passage 2a and the other end of the pulley radially extended working fluid passage 2b is opened within the driven pulley working fluid cylinder chamber 66, each pulley radially extended working fluid passage 2b penetrating radially through the pulley linkage portion 68b so that the pulley axially extended working fluid passage 2a is communicated with the driven pulley working fluid cylinder chamber 66.

The position of the pulley radially extended working fluid passage 2b in the axial direction is a position at which its opening faced toward the driven pulley working fluid cylinder chamber 66 is opposed radially against a neighborhood of a center portion of the coil spring 101 which is in a most constricted state (a state wherein an axial end of the pulley linkage portion 68b is brought in contact with the cylinder member 102 of the driven pulley working fluid cylinder chamber 66). Each pulley radially extended working fluid passage 2b is set so as to be opened to the driven pulley working fluid cylinder chamber 66 via any one of gaps formed between each opposing spirally wound part of the coil spring 101 in the most constricted state.

The working fluid passed through the driven axle axially extended working fluid passage 1 is supplied to the driven pulley working fluid cylinder chamber 66 via the pulley axially extended passages 2a and via the axial end of the pulley linkage portion 68b, is branched from the pulley axially extended working fluid passages 2b and into the driven pulley working fluid cylinder chamber 66.

The fluid pressure developed in the working fluid causes the movable sheave 68 to be moved in the axial direction of the driven axle 62.

When the movable sheave 68 is separated from the stationary sheave 64 until it (linkage portion 68b) is brought in contact with the cylinder member 102, the opening 2c of the pulley axially extended working fluid passage 2a faced toward the driven pulley working fluid cylinder chamber 66 is closed by means of the cylinder member 102.

In this state, since the opening of the pulley radially extended working fluid passage 2b faced toward the driven pulley working fluid cylinder chamber 66 is placed at a position at which the gap formed between each spirally wound part of the coil spring 101 and which has a widest pitch, the opening thereof is not closed by means of the coil spring 101 so that a communication state between the axially extended oil passage 1 and the driven pulley working fluid cylinder chamber 66 can be assured.

As described above, when the movable sheave 68 is not retracted until the movable sheave 68 is brought in contact with the cylinder member 102, the working fluid of the axially extended working fluid passage 1 is supplied to the driven pulley working fluid cylinder chamber 66 via the pulley axially extended working fluid passages 2a and the pulley radially extended working fluid passage 2b.

At this time, when the movable sheave 68 is moved, any one or more of the openings of the pulley radially extended working fluid passages 2b and faced toward the driven pulley working fluid cylinder chamber 66 may temporarily be closed. In this sate, no problem occurs when each pulley axially extended working fluid passage 2a is always communicated with the driven pulley cylinder chamber 66.

Consequently, the axially extended working fluid passage 1 is always communicated with the driven pulley cylinder chamber 66 via the pulley working fluid (oil) passage 2 regardless of the position of the movable sheave 68.

The pulley working fluid passage 2 in the embodiment is worked by providing the axial groove 3 on the inner peripheral surface of the pulley linkage portion 68b of the movable sheave 68 and by drilling oil holes for the pulley radially extended working fluid passages 2b which penetrate the pulley linkage portion 68b in the axial direction (a direction perpendicular to the axis of the driven axle 68). Hence, it is not necessary to drill the oil hole having the axis slanted through the movable sheave 68 as described in the BACKGROUND OF THE INVENTION and the workability thereof is improved.

In the embodiment, it is necessary to provide the axial groove 3. As shown in FIG. 3, it is necessary to provide a spline grooves 5 to link the movable sheave 68 to the driven axle 62 in the pulley linkage portion 68b of the movable sheave 68. When the spline groove 5 is worked, the axial groove 3 needs to be worked. Even if each pulley axially extended working fluid passage 2a is provided, a working trouble thereof is not considerably increased.

The oil holes for the pulley radially extended working fluid passages 2b in the embodiment are easy to be drilled since the axes thereof are faced in the radial direction and are drilled through the pulley linkage portion 68b which is thinner than the step portion 68c. Hence, the quality of drill is reduced. The working of the oil holes through the drills can be facilitated.

It is necessary to determine the positions of the pulley radially extended working fluid passages 2b so as to be located against any one of the gaps between each spirally wound part of the coil spring 101 with the movable sheave 68 separated from the stationary sheave 64 and the coil spring 101 in the most constricted state.

However, since the pitch of the constricted coil spring 101 at its axial center is normally wider than that at each end thereof, a working error in the position of the axial direction is allowed. The wider the gap is provided, the more sufficient opening area thereof can be assured. Furthermore, the coil spring member is spirally wound. The coil spring is correspondingly small.

Furthermore, the coil spring is spirally arranged. Although the three pulley radially extended working fluid passages 2b are disposed in the same cross section due to their easiness in working, the sufficiently wide opening area can be assured since the axial center portion of the coil spring 101 has a relatively wide pitch.

Figure 3:
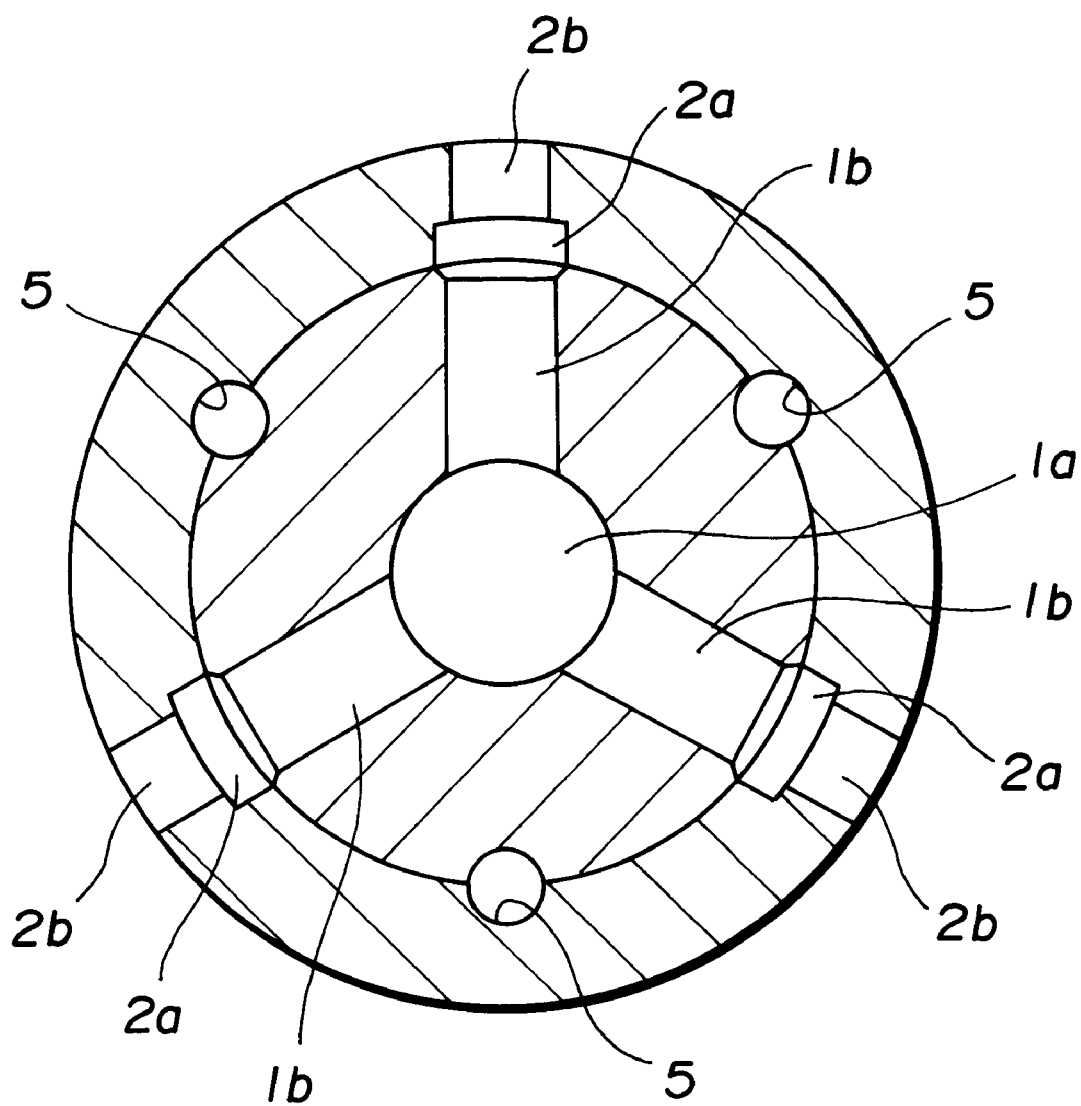
FIG. 3 is a cross sectional view for explaining a relationship between an (driven axle) axially extended oil passage and a pulley oil passage in the embodiment shown in FIG. 2.

Although, in the embodiment, as shown in FIG. 3, the cross sectional shape of the axial groove 3 constituting the pulley axially extended working fluid passage 2a is of a rectangular shape, a tool to work the ball spline groove 5 may be used to form the axial groove 3 of the same cross sectional shape as the ball spline groove 5. Consequently, a further workability may be improved.

The axial groove 3 constituting the pulley axially extended working fluid passage 2a may not be limited to the inner peripheral surface side of the pulley linkage portion 68b but a groove extended axially on the driven axle 62 may be formed together with the coil spring groove at the driven axle 62 to constitute the pulley axially extended working fluid passage 2a.

Although the pulley radially extended working fluid passages 2b are set at the approximately center position of the pulley linkage portion 68b in its axial direction, the pulley radially extended oil passage 2b may be set at the position at which any one of the gaps between each spirally wound part of the coil spring 101 when the coil spring 101 is in the most constricted state described above.

In addition, although an end 2c (refer to FIG. 2) of each pulley axially extended working fluid passage 2a which constitutes the first working fluid passage is communicated with the driven pulley working fluid cylinder chamber 66 in the embodiment described above, the end of each pulley axially extended working fluid passage 2a may not always be communicated with the driven axle working fluid cylinder chamber 66 in a case where the coil spring is not arranged within the drive axle side cylinder chamber 54 as the case of the drive pulley cylinder chamber 54 which drives the movable sheave 56 at the drive pulley. This is because the pulley radially extended working fluid (oil) passage is not closed by means of the coil spring.

Figure 4:
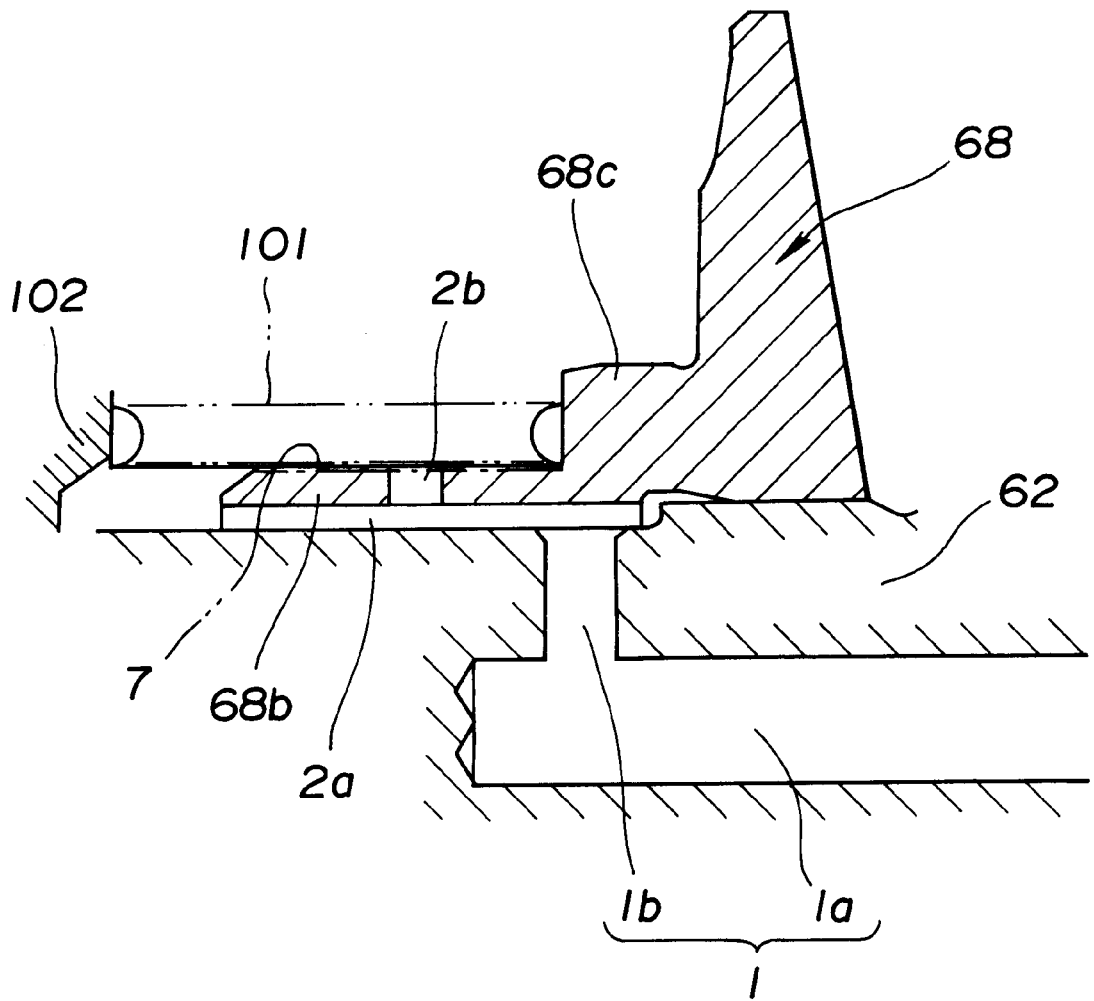
FIG. 4 is a side cross sectional view for explaining another movable sheave oil passage as a modification of the embodiment.

Furthermore, in a case where the coil spring 101 is arranged on the outer periphery of the pulley linkage portion 68b, for example, a groove 7 extended in the axial direction of the driven axle 62 (a direction crossing the spiral direction of the coil spring 101) and passed through the opening of each pulley radially extended working fluid passage 2b may be formed, as shown in FIG. 4. Hence, a state in which the pulley radially extended working fluid passages 2b are always communicated with the cylinder chamber 66 via the groove 7 without communication of each pulley axially extended working fluid passage 2a with the cylinder chamber 66.

What is claimed is:

1. An arrangement for a belt-type continuously variable transmission, comprising:

a) an elongate axle member;
   b) a stationary sheave fixed onto the axle member and having a first approximately oblique surface;
   c) a movable sheave movable along the axle member with respect to the stationary sheave and having a second approximately oblique surface;
   d) a V belt in an endless form wound on both mutually opposing first and second oblique surfaces of the stationary sheave and the movable sheave by which an approximately letter V-shaped groove is formed;
   e) a working fluid pressure cylinder chamber formed against a rear surface of the movable sheave with respect to the second oblique surface thereof;
   f) a pressurized working fluid which is supplied to the working fluid pressure cylinder chamber so as to move the movable sheave toward or away from the stationary sheave to make a gear shift of the belt-type continuously variable transmission;
   g) an axle member working fluid passage disposed within the axle member so as to be enabled for the pressurized working fluid to be supplied to the working fluid pressure cylinder chamber;
   h) a first working fluid passage which is communicated with the axle member working fluid passage at an opposing surface thereof against the movable sheave and the axle member and which is extended along an axial direction of the axle member; and
   i) a second working fluid passage penetrated radially through the movable sheave and having one end communicated with the first working fluid passage and the other end opened to the working fluid pressure cylinder chamber.

2. An arrangement as claimed in claim 1, which further comprises at least one coil spring disposed within the working fluid pressure cylinder chamber so as to bias the movable sheave to be approached to the stationary sheave and wherein one end of the first working fluid passage is communicated with the working fluid pressure cylinder chamber and the second working fluid pressure has the other end opened to the working fluid pressure cylinder chamber, the other end thereof being located at a position so as to face toward any one of gaps formed between each spirally wound part of the coil spring which is in a most constricted state with the movable sheave separated from the stationary sheave up to a most remotely separated position.

3. An arrangement for a belt-type continuously variable transmission as claimed in claim 2, wherein the other end of the second working fluid passage opened to the working fluid pressure cylinder chamber is located at the position so as to face toward an approximately center portion of the coil spring which is in the most constricted state with the movable sheave separated from the stationary sheave up to the most remotely separated position.

4. An arrangement for a belt-type continuously variable transmission as claimed in claim 3, wherein the movable sheave is restrained so as to be enabled to be moved in the axial direction of the axle member by means of a spline coupling and the first working fluid passage includes a groove formed on a surface of the movable sheave opposing to the axle member, the groove having the same cross sectional shape as a spline groove of the spline coupling.

5. An arrangement for a belt-type continuously variable transmission as claimed in claim 3, wherein the axle member is a driven axle for a driven pulley of the belt-type continuously variable transmission and the axle member working fluid passage includes a driven axle axially extended working fluid passage extended within the driven axle in the axial direction of the driven axle and a plurality of driven axle radially extended working fluid passages, each being communicated with a corresponding part of one end of the driven axle axially extended working fluid passage (1*a*) and being extended in a radial direction of the driven axle to be opened to an outer peripheral surface of the driven axle.

6. An arrangement for a belt-type continuously variable transmission as claimed in claim 5, wherein the first working fluid passage includes an axially extended groove formed on an inner peripheral surface of a pulley linkage portion of the movable sheave and a space formed against the outer peripheral surface of the driven axle opposed to the axially extended groove and extended along the axial direction of the driven axle so as to be opened to the working fluid pressure cylinder chamber at an end thereof.

7. An arrangement for a belt-type continuously variable transmission as claimed in claim 6, wherein the axially extended groove (3) is disposed at a position of the pulley linkage portion (68*b*) of the movable sheave (68) so as to be enabled for its circumferential direction thereof to be opposed against an opening of the driven axle radially extended working fluid passage and is extended in the axial direction up to an axial end portion of the pulley linkage portion so that the pulley axially extended working fluid passage is communicated with a driven pulley working fluid cylinder chamber constituting the working fluid pressure chamber.

8. An arrangement for a belt-type continuously variable transmission as claimed in claim 7, wherein each pulley radially extended working fluid passage has one end thereof communicated with the pulley axially extended working fluid passage and the other end thereof opened toward the driven pulley working fluid cylinder chamber so that the pulley axially extended working fluid passage is communicated with the driven pulley working fluid cylinder chamber.

9. An arrangement for a belt-type continuously variable transmission as claimed in claim 8, wherein the plurality of driven axle radially extended working fluid passages are three, each being radially extended and having a phase angle of approximately 120° with respect to another adjacent driven axle radially extended working fluid passage.

10. An arrangement for a belt-type continuously variable transmission as claimed in claim 9, wherein the belt-type continuously variable transmission is associated with a vehicular engine, the working fluid is an oil, and wherein the pulley linkage portion of the movable sheave is provided with a spline groove used to link the movable sheave with the driven axle.

* * * * *

UNITED STATES PATENT AND TRADEMARK OFFICE
CERTIFICATE OF CORRECTION

PATENT NO.   : 5,941,787
DATED        : August 24, 1999
INVENTOR(S)  : Makoto IMAIDA *et al.*

It is certified that error appears in the above-identified patent and that said Letters Patent is hereby corrected as shown below:

Title page, at Item [73] Assignee, please insert after "Nissan Motor Co., Ltd., Yokohama, Japan" --AICHI MACHINE INDUSTRY CO., LTD., Nagoya-shi, Japan Signed and Sealed this Twenty-ninth Day of August, 2000

Attest:

Q. TODD DICKINSON

Attesting Officer

Director of Patents and Trademarks